(12) United States Patent
Baker et al.

(10) Patent No.: US 8,076,614 B2
(45) Date of Patent: Dec. 13, 2011

(54) MULTI-STAGE COOKING SYSTEM USING RADIANT, CONVECTION, AND MAGNETIC INDUCTION HEATING, AND HAVING A COMPRESSED AIR HEAT GUIDE

(75) Inventors: Edward D. Baker, Windsor, CA (US);
Matthew J. Baker, Windsor, CA (US);
Patrick D. Baker, Windsor, CA (US);
Mohsen Sarfehjoo, Franklin, TN (US);
Erik Magner, Fort Wayne, IN (US)

(73) Assignee: Nieco Corporation, Windsor, CA (US)

( * ) Notice: Subject to any disclaimer, the term of this patent is extended or adjusted under 35 U.S.C. 154(b) by 94 days.

(21) Appl. No.: 12/410,284

(22) Filed: Mar. 24, 2009

(65) Prior Publication Data
US 2009/0181146 A1 Jul. 16, 2009

Related U.S. Application Data

(63) Continuation-in-part of application No. 11/849,854, filed on Sep. 4, 2007.

(60) Provisional application No. 60/824,419, filed on Sep. 1, 2006, provisional application No. 61/144,693, filed on Jan. 14, 2009.

(51) Int. Cl.
*F27B 9/12* (2006.01)
*F27B 9/36* (2006.01)

(52) U.S. Cl. ........ 219/388; 219/400; 219/411; 219/601; 99/443 C (58) Field of Classification Search .................. None
See application file for complete search history.

(56) References Cited

U.S. PATENT DOCUMENTS

| | | | | |
|---|---|---|---|---|
| 3,790,735 A * | 2/1974 | Peters, Jr. | ...................... | 219/622 |
| 3,830,624 A * | 8/1974 | Sperring et al. | .............. | 432/145 |
| 3,987,718 A | 10/1976 | Lang-Ree et al. | | |
| 4,121,509 A | 10/1978 | Baker et al. | | |
| 4,164,591 A | 8/1979 | Ahlgren et al. | | |
| 4,188,868 A | 2/1980 | Baker et al. | | |
| 4,936,286 A | 6/1990 | Baker et al. | | |
| 5,177,333 A * | 1/1993 | Ogasawara | .................... | 219/601 |
| 5,277,924 A | 1/1994 | Padilla | | |
| 6,864,468 B2 * | 3/2005 | Kim et al. | ...................... | 219/601 |
| 6,915,734 B2 * | 7/2005 | Torghele et al. | ................ | 99/348 |
| 7,170,036 B2 * | 1/2007 | Richert et al. | ................ | 219/388 |
| 7,193,184 B1 * | 3/2007 | Manning | ........................ | 219/388 |
| 7,220,944 B2 * | 5/2007 | Miller et al. | .................. | 219/388 |
| 7,488,919 B2 * | 2/2009 | Gagas et al. | .................. | 219/400 |
| 2004/0144773 A1* | 7/2004 | Kim et al. | ...................... | 219/601 |
| 2005/0256774 A1 | 11/2005 | Clothier et al. | | |
| 2007/0137633 A1* | 6/2007 | McFadden | .................. | 126/21 A |
| 2010/0051600 A1* | 3/2010 | Maier | ............................ | 219/401 |

FOREIGN PATENT DOCUMENTS

JP 11056213 A * 3/1999
WO WO 2009136010 A1 * 11/2009

* cited by examiner

*Primary Examiner* — Joseph M Pelham
(74) *Attorney, Agent, or Firm* — Craig M. Stainbrook; Stainbrook & Stainbrook, LLP (57) ABSTRACT

A cooking system for cooking foods using a combination of magnetic induction, convection and radiant heat, including a magnetic induction stage proximate the inlet end of a cooking chamber in which food is cooked by convention and radiant heating. A conveyor system, either continuous or configured in stages, passes food from the magnetic induction heating stage to and through the radiant and convention heating stages.

10 Claims, 8 Drawing Sheets

MULTI-STAGE COOKING SYSTEM USING RADIANT, CONVECTION, AND MAGNETIC INDUCTION HEATING, AND HAVING A COMPRESSED AIR HEAT GUIDE

CROSS REFERENCES TO RELATED APPLICATIONS

The present application is a continuation-in-part of U.S. Utility patent application Ser. No. 11/849,854, filed Sep. 4, 2007, which in turn claims the benefit of the filing date of U.S. Provisional Patent Application 60/824,419, Sep. 1, 2006; and further claims the benefit of U.S. Provisional Application Ser. No. 61/144,693, filed Jan. 14, 2009.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to broiler systems for the rapid cooking of food products, and more particularly to a broiler system combining different kinds of heating methods and including a novel compressed air system and heating element combination which guides and directs heat onto food product in the cooking chamber. The system is adapted for cooking a variety of food products through the combination of magnetic induction, radiant, and convection heat.

2. Discussion of Related Art including Information Disclosed under 37 CFR §§1.97, 1.98

To prepare certain foods, such as pizzas, hamburger patties, sausages, hot dogs, chicken and fish fillets, and the like, as well as their respective buns, high output commercial food purveyors (i.e., fast food restaurants) utilize cooking systems (usually broilers) that rapidly and continually cook the food products. The systems typically comprise a housing having a horizontal conveyor for moving food product from an input end to an output end. During the cooking process the food passes between a number of spaced-apart cooking elements, typically either electric resistance elements or gas burners. As may be readily appreciated, the profitability of utilizing such a system hinges on a number of factors, including the rapidity and efficiency with which the food product can be cooked, the minimization of energy and/or fuel utilized in cooking, the ease with which the system can be serviced and cleaned, the quality (and therefore desirability) of the cooked food products, and so forth.

The present invention improves on prior art broiler systems by providing a system which includes a combination of magnetic induction heating element, gas or electric heating elements, a compressed air system which distributes and directs forced air through an plenum disposed above the cooking food product into the cooking chamber, and heat reflecting surfaces (i.e., radiant heat/infrared heating elements) on both the underside of the air plenum and on other structures within the cooking chamber. The combination multi-stage cooking system provides rapidly cooked food products of uniform doneness, high quality, and moisture content.

Several rapid cooking broiler systems have been developed for use in the fast food industry, including those described in the following U.S. patents and patent applications.

U.S. Pat. No. 4,936,286, to Baker, discloses a broiler system having at least two side-by-side broiling conveyors, and broiler units mounted adjacent to the conveyors extending across the combined widths of the two conveyors. To permit different heating conditions on the two conveyors while still permitting the broiler units to be interchangeable and made of interchangeable parts, a broiler unit is provided with a shield which blocks off the heated face of the broiler unit where the broiler unit faces one of the conveyors. The shield preferably carries a portion which extends towards the adjacent edges of two conveyors to prevent lateral heat radiation between the conveyors.

U.S. Pat. No. 4,188,868, to Baker et al, shows a broiler system having a food passageway restricted by baffles, including an entrance shield of heat-reflecting material formed as a fitting over the entrance burner housing and including a baffle sheet extending from the entrance burner housing through most of the gap toward the entrance opening, and an exit shield of similar heat-reflecting material formed as a fitting over the exit burner housing and having a baffle sheet extending from the exit burner housing through most of the gap toward the exit opening. In addition, there is an intermediate shield including a horizontal sheet of similar material resting on adjacent burner housings and having a vertical sheet depending from said horizontal sheet. The entrance shield, the exit shield and the intermediate shield define the upper limits of the passageway through the burner and tend to reflect heat away from the entrance and exit openings and to limit air circulation within and through the passageway.

U.S. Pat. No. 4,121,509, to Baker et al., teaches a housing having a passageway through which a continuous food conveyor operates, taking food products from an inlet end to an outlet end. Within the passageway the food products are exposed to infrared radiation from heaters, hot air blown from a fan through a supply duct and through groups of nozzles onto the patties, and steam or hot water vapor provided through the air supply. By using three different types of heat supply—direct infrared radiation, warm air, and water vapor—the system provides a quickly cooked food product having a relatively high moisture content.

U.S. Pat. No. 3,987,718 to Lang-Ree et al., discloses a hamburger patty and bun cooker having a frame supporting lower and upper heated platens. A product conveyor, typical of such systems, moves food product from the inlet to the outlet. At least one of the platens is provided with a low-friction layer between it and an advancing patty. The layer is constituted by jets of hot air discharged over the platen surface or by a Teflon-coated thin, metal foil sheet or by a Teflon-carrying thin, fiber glass sheet, the sheets being readily changeable. Bun portions for the individual patties are advanced on the same frame in paths parallel to the hamburger patties by comparable endless conveyors and are heated by individual platens on the frame as the bun portions advance.

U.S. Pat. No. 5,277,924 to Padilla, teaches a conveyorized pizza cooking system that includes a radio frequency chamber located downstream of the pizza loading station for proofing pizza dough shells using RF energy in the radio frequency chamber on the conveyor. It does not include a magnetic induction plate.

U.S. Pat. Appl. Ser. No. 2005/0256774 by Clothier et al, teaches a food preparation system that conveys food during cooking and includes at least one heating station, which may include one or more induction cooktops.

U.S. Pat. No. 6,915,734 to Torghele et al, teaches an automated pizza production oven in which an automatically prepared pizza is baked in one of multiple ovens. One unit may be an induction unit, although such a unit is not shown in combination with other kinds of heating methods.

U.S. Pat. No. 4,164,591 to Ahlgren et al, disclose a pizza oven having a track for conveying pizzas through a cooking chamber with multiple oven types, including convection oven with radiant heat and a toasting zone. An intermediate section includes a baking zone which is not directly exposed to heating elements but where heating is by convection from the heater elements.

While some of the foregoing publications teach the use of magnetic induction for heating and/or cooking pizza, none show a cooking system in which magnetic induction is employed as one stage of a multi-stage cooking process that also utilizes convection and/or radiant heating. However, the foregoing patents do reflect the current state of the art of which the present inventors are aware. Reference to, and discussion of, these patents is intended to aid in discharging the respective Applicants' acknowledged duties of candor in disclosing information that may be relevant to the examination of claims to the present invention. However, it is respectfully submitted that none of the above-indicated patents and patent applications disclose, teach, suggest, show, or otherwise render obvious, either singly or when considered in combination, the invention described and claimed herein.

BRIEF SUMMARY OF THE INVENTION

The present invention is an improved combination multi-stage cooking system, which combines in novel fashion a magnetic induction heating stage with convection and radiant heating. Notable among the novel elements is the use of a magnetic induction heating stage physically incorporated into a cooking system in close proximity to a convection and radiant heating cooking chamber, but provided with shielding to prevent damage to the magnetic induction coils.

Equally notable among the novel elements is the provision and use of a compressed air system wherein pressurized air is delivered through one or more plenums disposed over the food product conveyor and the heating elements. Pressurized air is delivered into the plenums from a source of compressed air and is then passed through a plurality of holes in the underside(s) of plenum in proximity to one or more heating elements disposed in the cooking chamber. In this manner, forced air is directed toward the food product. When frozen foods are being cooked (e.g, frozen hamburger patties), the air will help break up the water vapor envelope that typically covers and insulates the food product as it initially thaws and begins heating. This facilitates cooking and enhances browning. In the case of all kinds of foods, The inventive system optionally includes a novel gas burner element with a novel radiant shroud having a wing configuration that directs and distributes gas flames so as to spread the heat provided by the elements and to include radiant heating surface on the underside of the wings.

It is therefore an object of the present invention to provide a new and improved multi-stage magnetic induction, convection, and radiant heat cooking system for use in conveyor and non-conveyor ovens, broiler systems, toasters, and that like, that cooks foods rapidly.

It is another object of the present invention to provide a new and improved cooking system that utilizes forced air to break the protective blanket of cold air surrounding frozen food products so as to expose the food surfaces to cooking heat early in the cooking process.

Yet another object of the present invention to provide a new and improved cooking system that utilizes forced air to direct and confine heat from heating elements in a cooking chamber to increase food heating efficiency.

A further object or feature of the present invention is a new and improved cooking system that enhances the ability to produce a more uniform and aesthetically pleasing browning of rapidly cooked foods.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

The invention will be better understood and the objects of the invention will become apparent when consideration is given to the following detailed description thereof. Such description makes reference to the annexed drawings wherein.

DETAILED DESCRIPTION OF THE INVENTION

Referring first to FIGS. 1 through 6, wherein like reference numerals refer to like components in the various views, there is illustrated therein a new and improved multi-product cooking system, generally denominated 100 herein.

Figure 1:
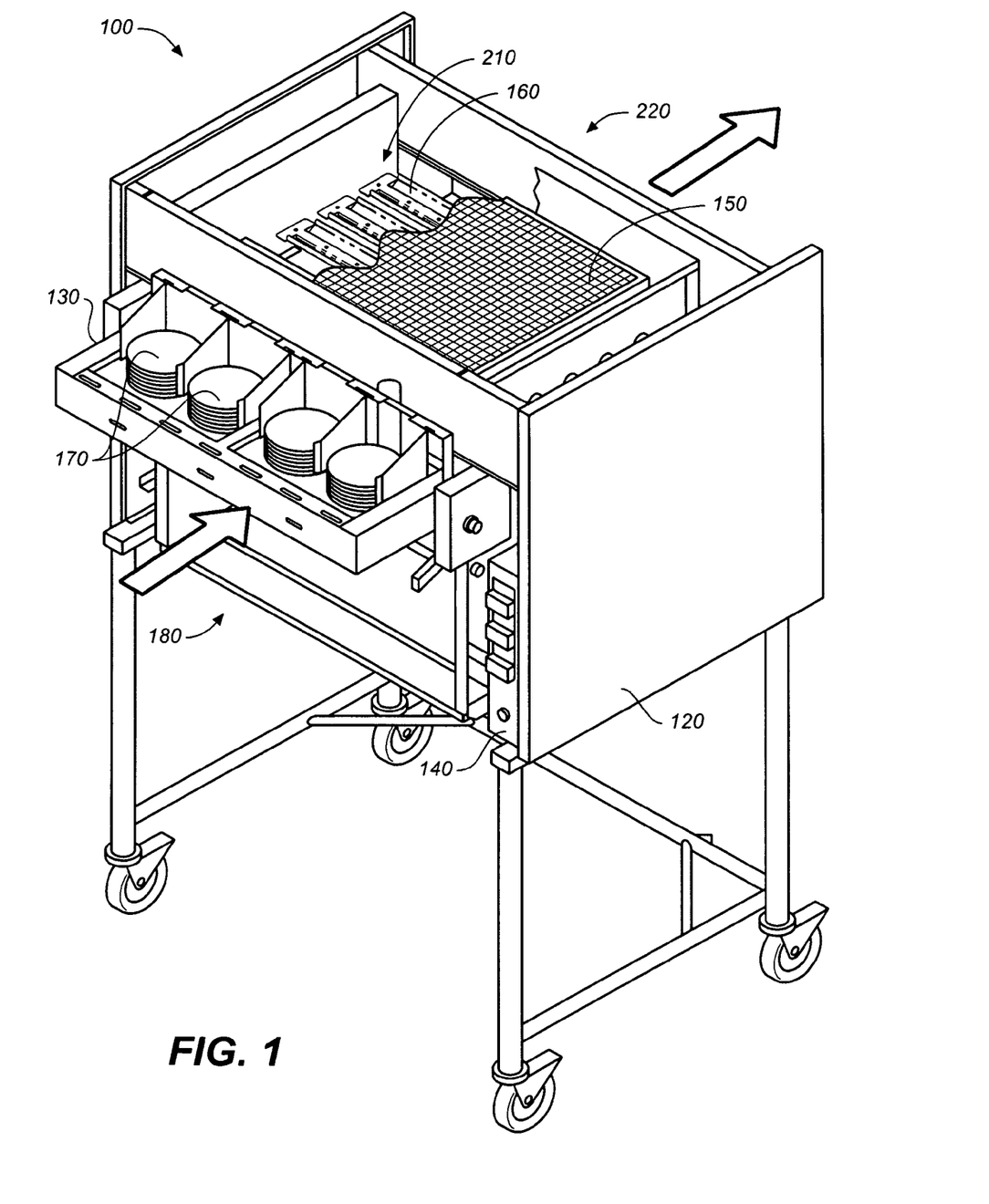
FIG. 1 is a perspective view of the inventive multi-stage forced air cooking system, showing the system with the top cover removed and the upper catalytic converter partly cut away to reveal the upper gas burner array, this view not showing the magnetic induction heating stage included.
Figure 2:
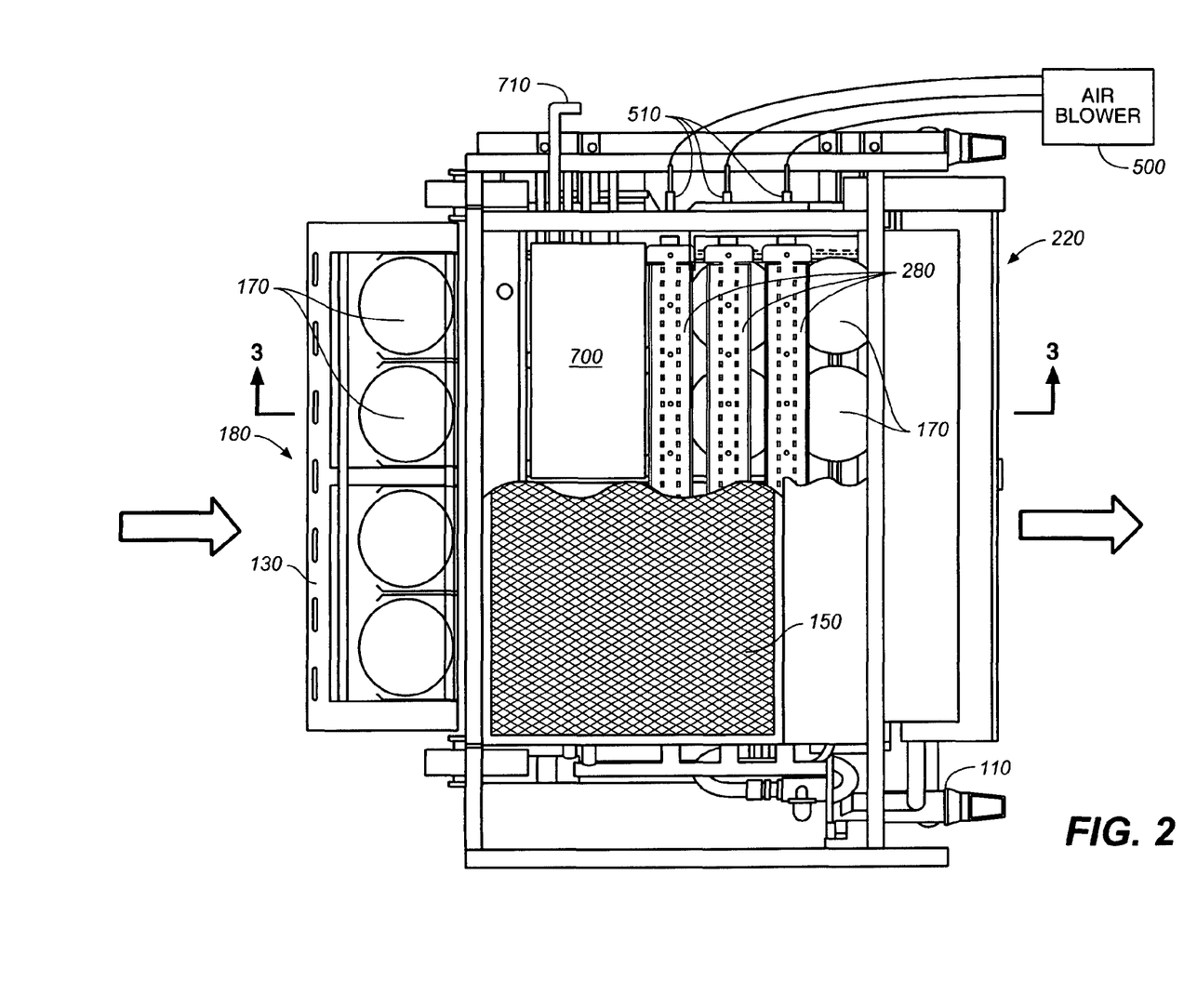
FIG. 2 is a partial cross-sectional top plan view showing the burner array, upper catalytic unit, and air supply plenum of the system of FIG. 1.
Figure 3:
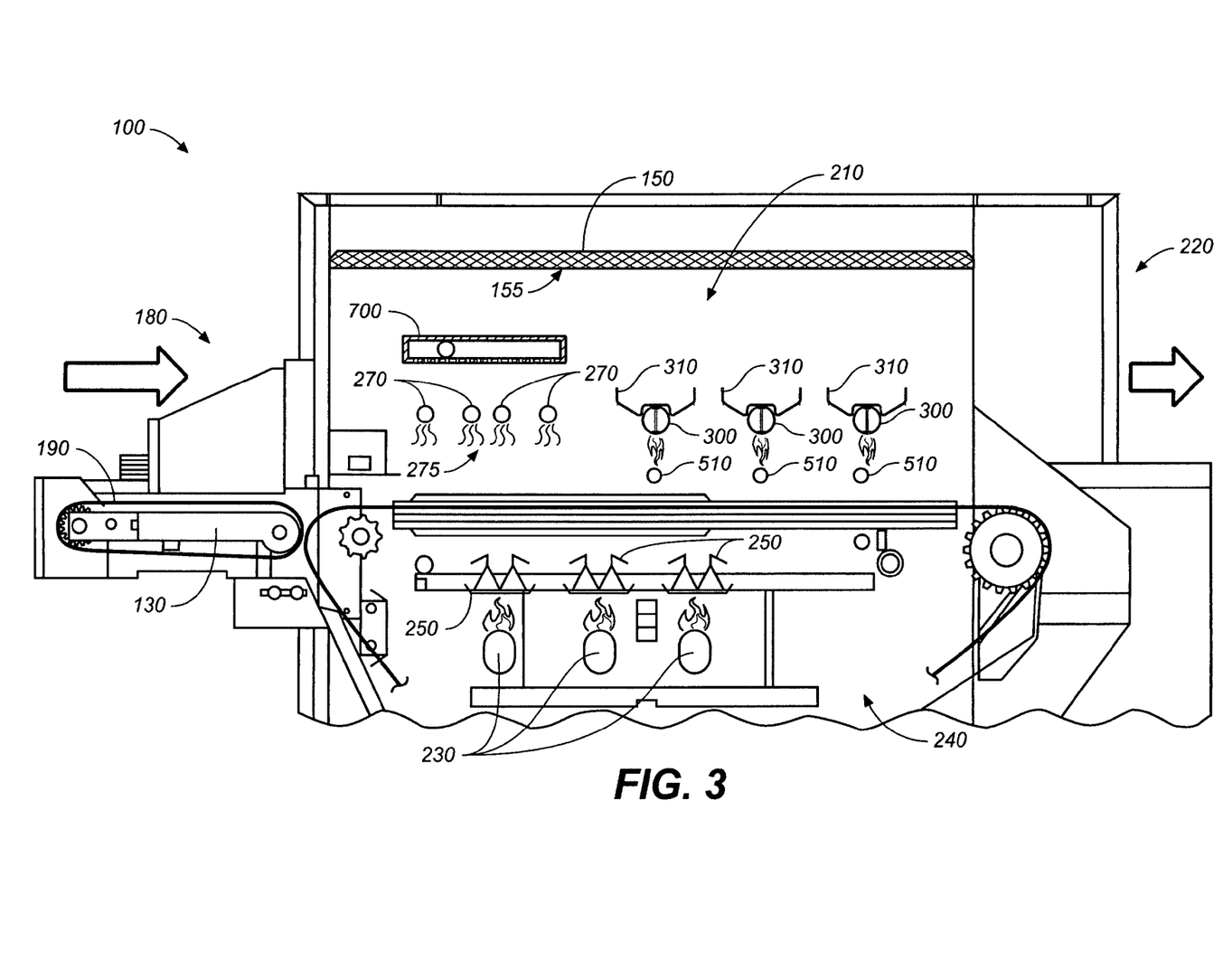
FIG. 3 is a cross-sectional side view in elevation of the upper portion of the broiler housing and heating system taken along the Section lines 3-3 shown in FIG. 2.
Figure 4:
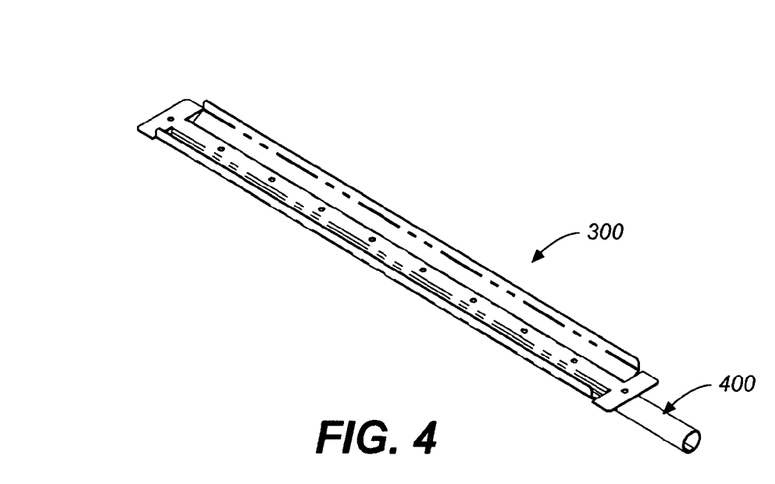
FIG. 4 is a perspective view of the novel gas burner and radiant cap for the gas burners as employed in a preferred embodiment of the present inventive cooking system.
Figure 5:
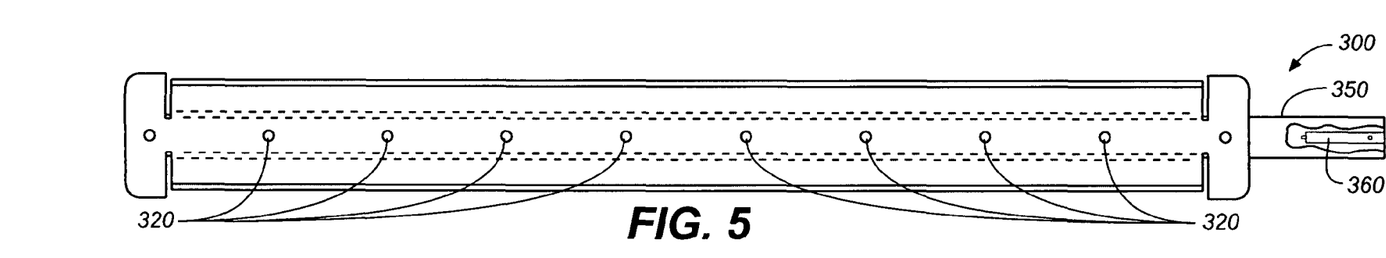
FIG. 5 is a top plan view of the gas burner of FIG. 4.
Figure 6:
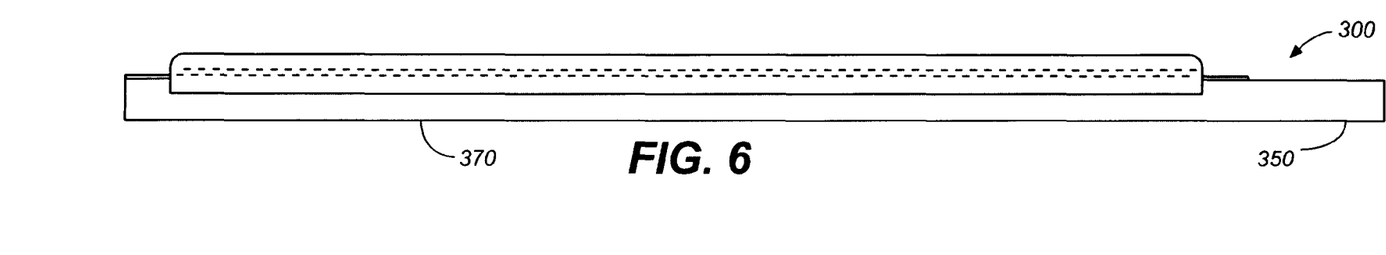
FIG. 6 is side view in elevation of the gas burner of FIGS. 4 and 5.
Figure 7:
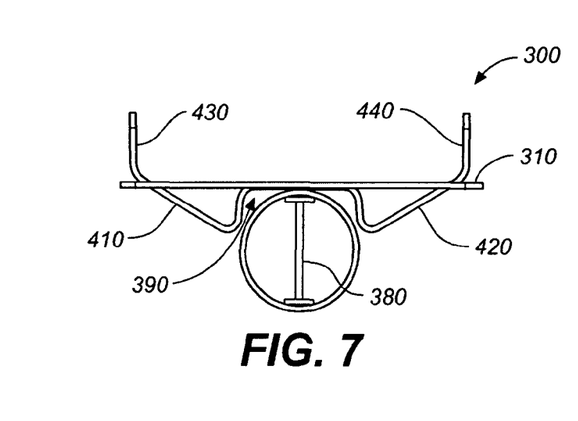
FIG. 7 is an end view in elevation of the gas burner and radiant cap.
Figure 8:
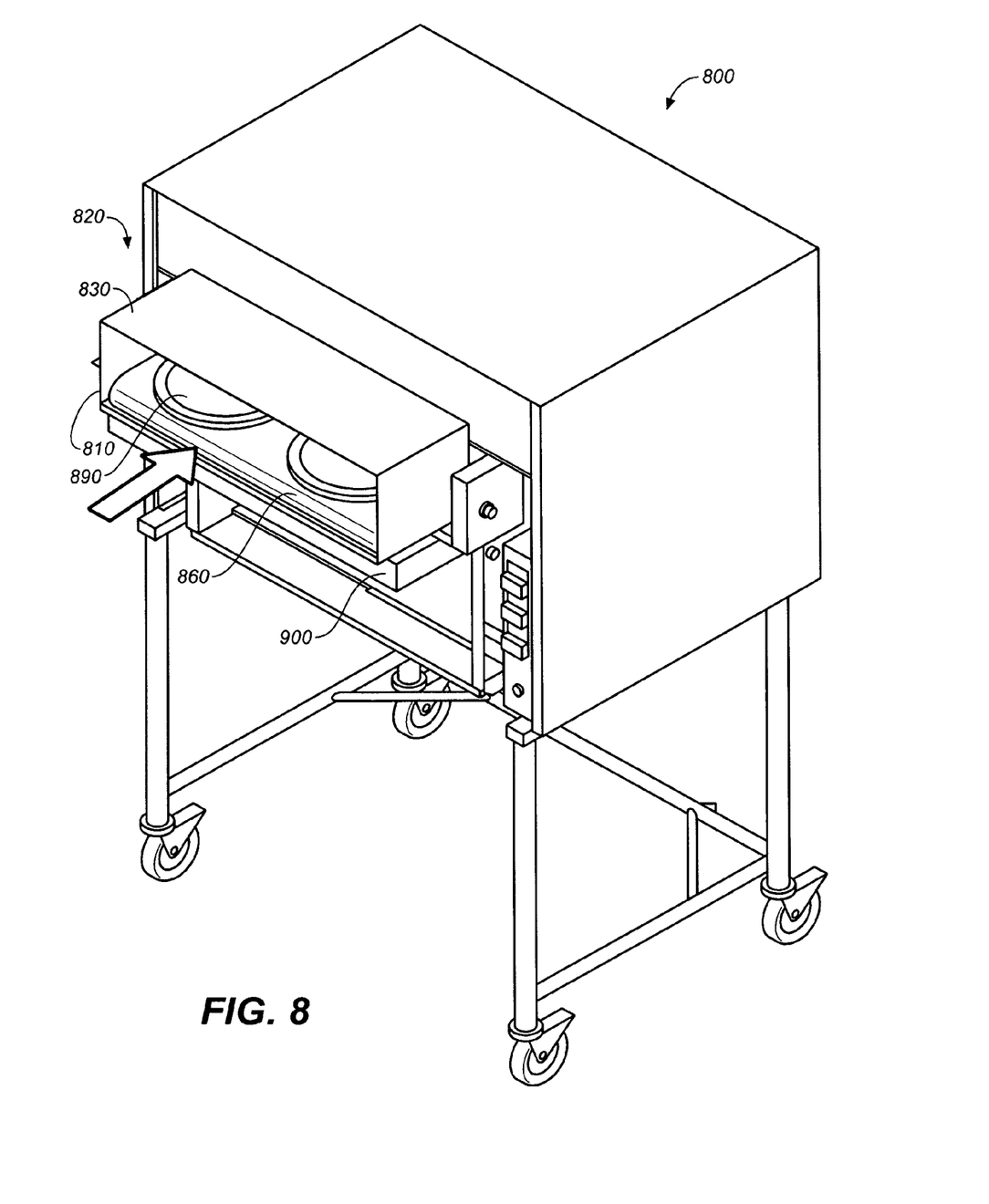
FIG. 8 is a perspective view of the inventive cooking system as shown in FIGS. 1-7, but further including a magnetic induction heating stage.
Figure 9:
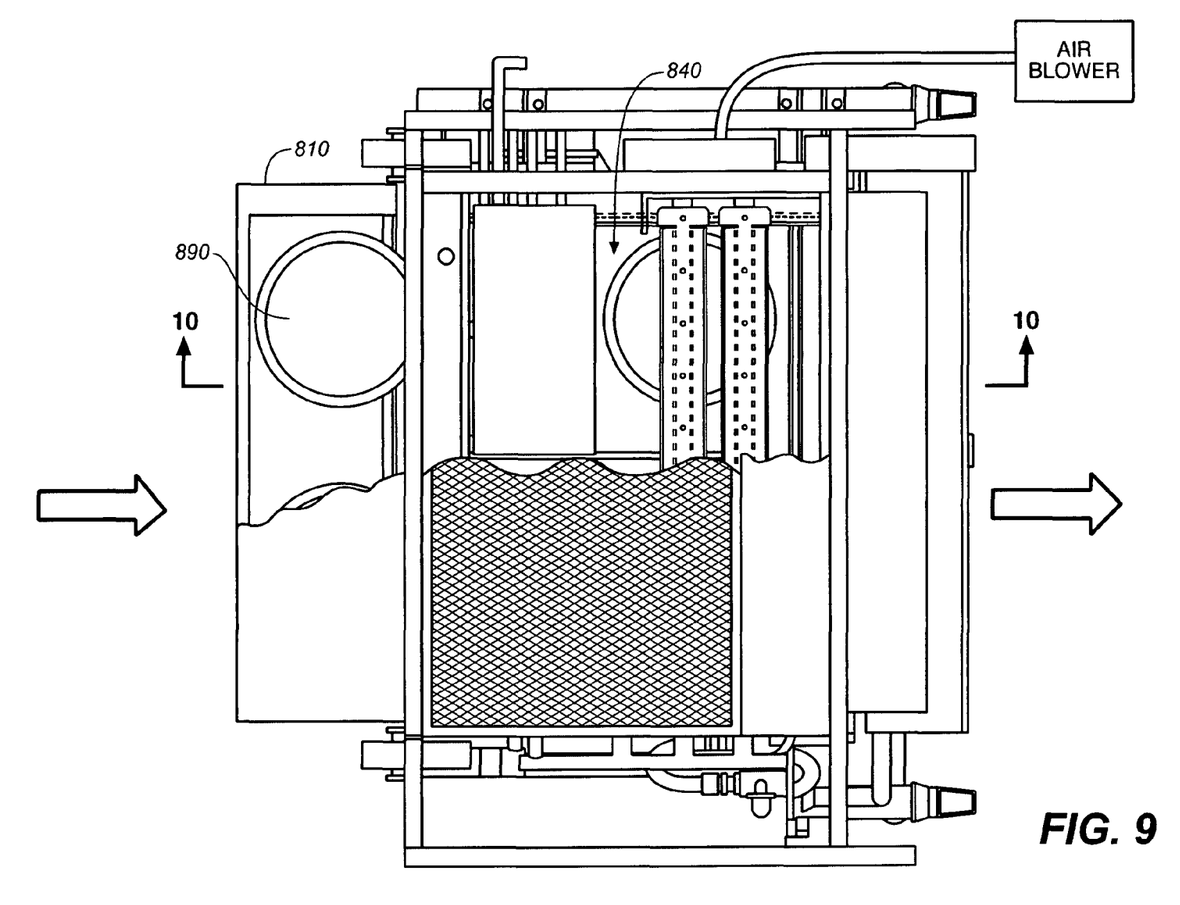
FIG. 9 is a partial cross-sectional top plan view thereof.
Figure 10:
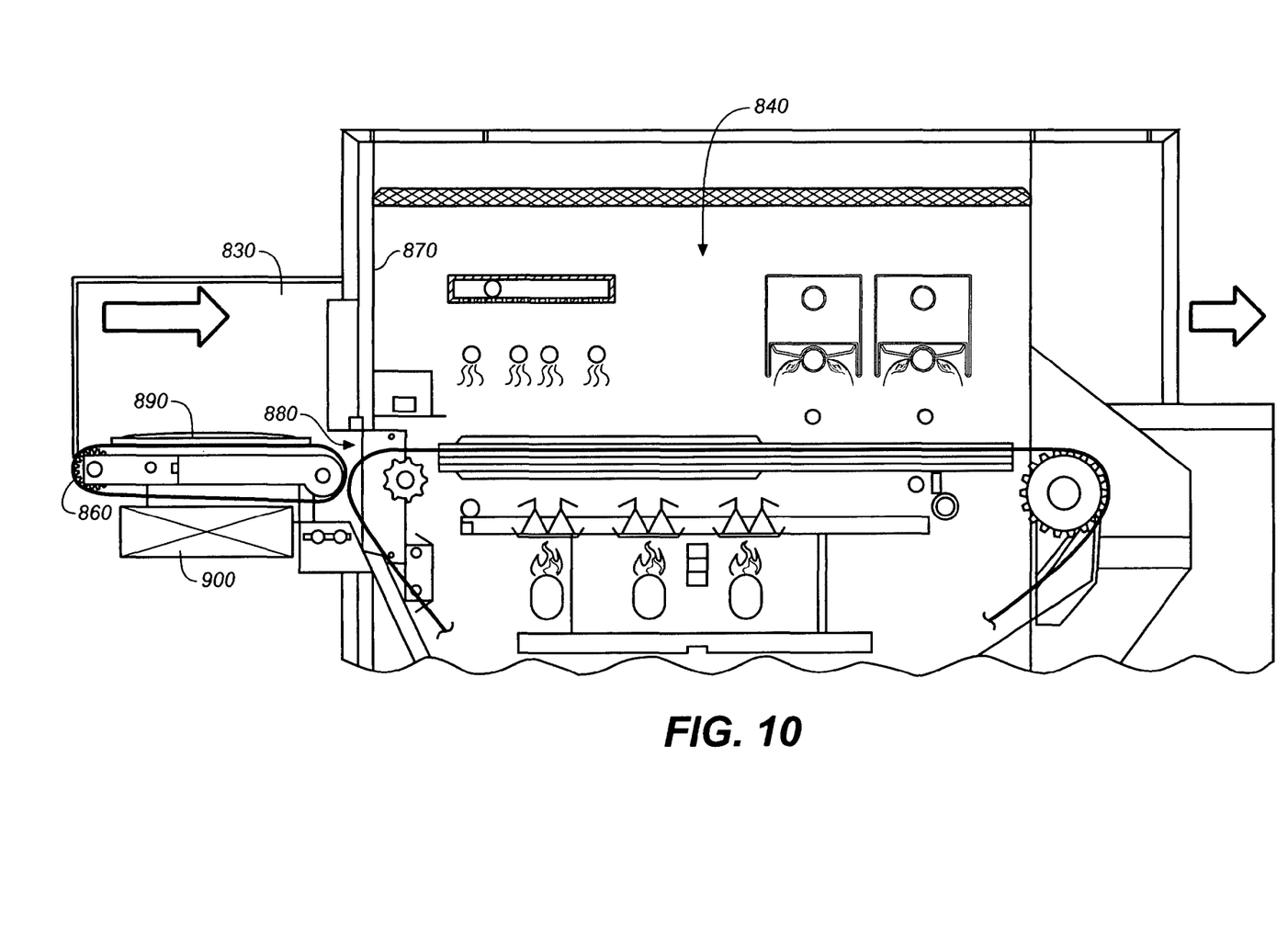
FIG. 10 is a cross-sectional side view in elevation thereof, as taken along section line 10-10 of FIG. 9.

FIGS. 1-3 illustrate the general structural and operative elements of a first preferred embodiment of the cooking system of the present invention 100, showing that the inventive apparatus includes: a support frame and carriage 110; a cooking chamber (or housing) 120 (preferably stainless steel); an automatic food product feeder 130; a cooking control panel 140 presenting a consolidated plurality of control dials, button, switches, and the like; an upper catalytic converter 150; and an upper gas burner array 160.

Food products, such as pizza and hamburger patties 170, are conveyed into the inlet end 180 of the cooking chamber using the automatic product feeder, and via an inlet product conveyor 190, the food product is passed on to a product conveyor belt or grid 200, which moves the food product through the cooking chamber 210 and to the outlet end 220 of the housing. In the most general terms, the cooking chamber includes a constellation of electric resistance heating elements and/or gas burners, each in spaced-apart arrays and disposed both above and below the product conveyor belt, as well as a plurality of reflective surfaces, all of which combine to provide both radiant and convective heat tailored to produce a continuous output of highly desirable food products in minimal time. More specifically, in a preferred embodiment, the cooking chamber includes a plurality of lower gas burners 230 disposed in the lower portion 240 of the cooking chamber to provide convective heat to the chamber. Optionally, at least one electric heating element can be positioned in the lower portion of the cooking chamber to introduce a measure of radiant heat in the initial cooking stages. Disposed immediately above the lower burners are drip shields 250, which protect the lower burner flames and prevent flare ups.

The first stage of broiling in the upper portion 260 of the heating chamber is provided by a plurality of radiant electric elements 270 disposed transversely above the product conveyor belt. These elements preheat the food product or initiate a quick thaw if frozen product is used. As will be immediately appreciated, this effect is complemented by the heat provided by the lower heating elements and burners. The heat output 275 of the electric heating elements can be varied by using an automated percentage timer to vary wattage, as is well known in the art. The second stage of upper broiling and cooking is provided by a plurality of gas burners 300, each provided with a novel reflector cap 310 and having a substantially linear array of orifices or ports 320 on a bottom side 330. The reflector cap deflects flame from away from the burner and further reduces burner temperature while simultaneously creating a surface that contributes to radiant heat to accelerate cooking. Preferably, while the upper burners may be on a common gas supply with the lower burners, they are on a discrete control circuit so that they can be adjusted for output independently from the lower burners.

Optionally, a source of compressed air (preferably low pressure air of approximately roughly 5 psi) 500 can be provided to inject air into some or all of the heat cones produced by the gas burners to shape and control the flame field characteristics and cooking effects. Optimally, the air source is either an air pump or small compressor, rather than a fan, and is injected through a plurality of air injector nozzles 510 having tips tailored to create the desired flame and heat cone characteristics.

Disposed at the top of the cooking chamber is a catalytic converter 150, which may optionally be placed under negative air pressure, and which removes grease and smoke. However, the unit is also provided with a reflective lower surface 155 which is a primary producer of radiant heat in the cooking chamber. Accordingly, in addition to cleaning and conditioning vented gasses, the catalytic converter improves the heat profile, saves energy, and reduces cooking time.

Next, a box-shaped air plenum 700 is provided and disposed above resistance elements 270. The plenum is in fluid communication with an air source through an air inlet 710. The includes a plurality of small air outlet orifices so as to provide a gentle moving bank of air over the food product in the initial "quick thaw" stage of cooking. The moving air breaks the blanket of protective cold air that typically rests on frozen food product as it first enters a cooking apparatus, thereby exposing the surfaces of the food product to effective heating temperatures at an early stage of cooking in the cooking chamber. The plenum is height adjustable so that the volume and velocity of air directed onto the food product may be tailored to the particular food product cooking requirements.

The above-described upper burner system also allows the burners to be positioned at an optimum height above the food product, so that a single height setting can be employed for a variety of products. This eliminates the need for multiple broiling systems or machine having multiple chambers with differing heating element heights. By eliminating the need to adjust burner heights, the changeover to cooking food products having widely different broiling requirements is streamlined and simplified. Most of the cooking differences can be addressed with easy adjustments to either or both upper and lower burner sets.

FIGS. 4 through 7 show details of the gas burner 300 and radiant reflector cap 310 employed in the inventive oven system. These views show that the burner has a generally cylindrical elongate tube body 340 having a gas inlet portion 350 for insertion of a gas jet nozzle 360, and a burner portion 370 having a burner orifice array 320 disposed on the bottom of the body. The burner portion further includes a vertically disposed I-beam support element 380 running substantially the entire length of the burner portion of the tube body. This provides increased structural integrity which resists deformation under high heat.

The reflector cap 310 comprises a medial channel portion 390 which is disposed over the top portion 400 of the tube body. Angling upwardly from the lower edges of the channel portion are generally symmetrical wing portions 410, 420, which curve into substantially vertical walls 430, 440, at the level of top of the tube body. The tube body portion has an unexposed bottom which exposes the burner orifice array 320. The burner outlet array and reflector cap configuration confines and controls the shape of the heat cone to minimize indirect heating of the burner and maximize the production of radiant heat.

Referring next to FIGS. 8-10, and 12-12A, there is shown another preferred embodiment 800 of the present invention, which includes a magnetic induction heating stage 810. This stage may be provided at the inlet end 820 of the system, possibly replacing the automatic product feeder or interposed between the automatic product feeder and the conveyor for the cooking chamber. The magnetic induction stage includes a magnetic induction cooking chamber 830 in limited fluid communication with the primary cooking chamber 840 in which the convention and radiant heating apparatus are disposed. The magnetic induction cooking chamber includes a dedicated conveyor 850 independent of the primary conveyor system 860, and may be partially partitioned from the primary cooking chamber by a barrier 870 with an opening 880 in its lower portion that allows passage of food product 890 from the magnetic induction cooking chamber into the primary cooking chamber. That passage is effected by a handoff of the food product from the magnetic induction conveyor to the primary conveyor.

Figure 12:
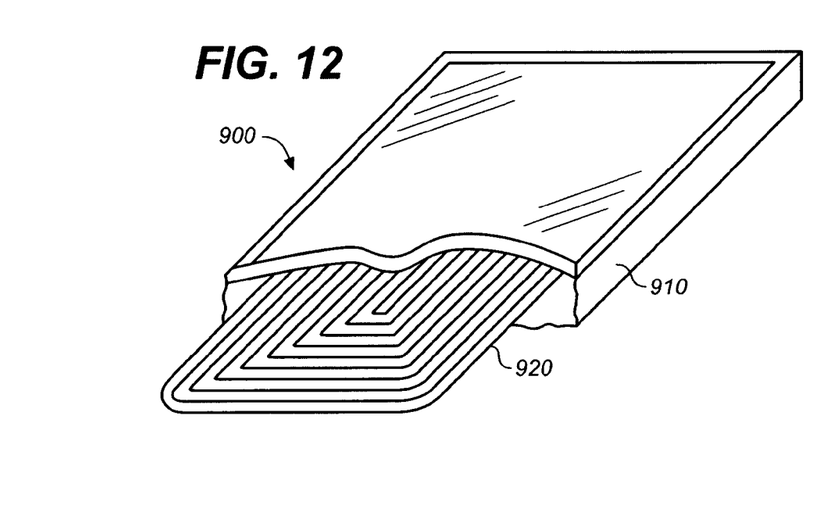
FIG. 12 is a partial cross sectional perspective view taken along section line 12-12 of FIG. 11, showing the magnetic induction coils sandwiched in a ceramic glass enclosure for protection from radiant and convection heat.
Figure 12A:
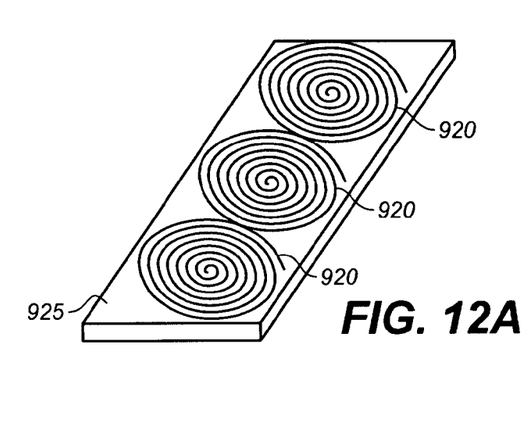
FIG. 12A shows an alternative configuration of magnetic induction coils that may be enclosed within the protective enclosure shown in FIGS. 11 and 12.

Disposed below the magnetic induction conveyor is a magnetic induction heating element 900, which comprises an enclosure 910 fabricated from ceramic glass or other similarly insulative and protective material. Along with the barrier 870, this enclosure protects the magnetic induction coils 920 from becoming damaged by the high heats generated in the primary cooking chamber. FIG. 12A shows that the magnetic induction heating element may include a plurality of coils 920 disposed and/or embedded in a ceramic or glass enclosure, or an enclosure 925 fabricated from any suitably insulative and protective material.

Figure 11:
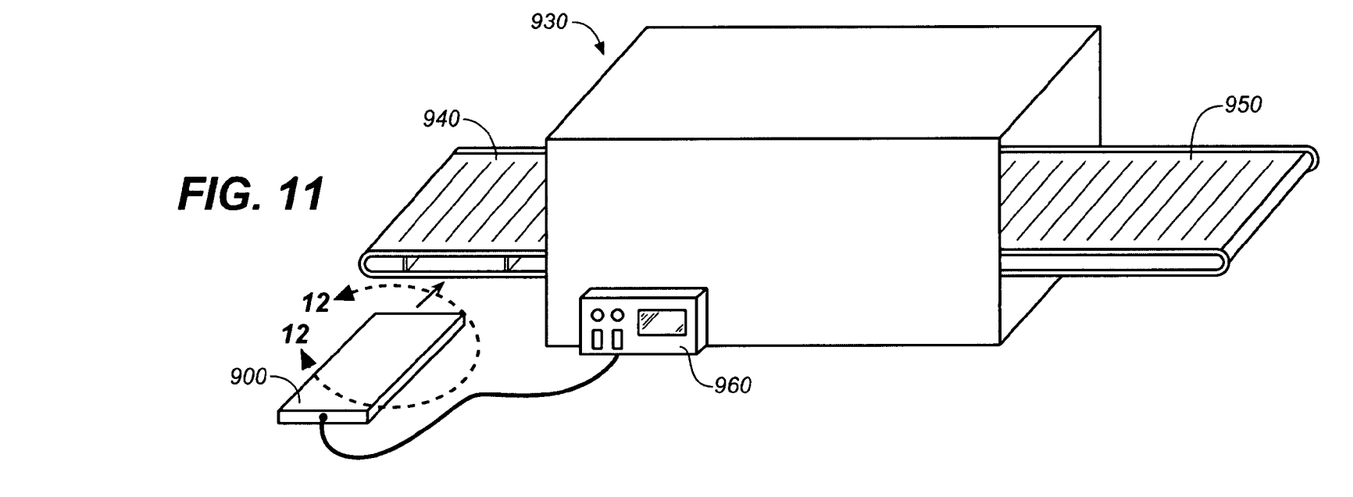
FIG. 11 is an upper front perspective view schematically showing how the magnetic induction plate is incorporated into the conveyor oven of the present invention.

FIG. 11 shows an alternative implementation 930 of the combination multi-stage cooking system, wherein the magnetic induction heating stage is not provided in an independent housing but is rather open and is disposed underneath the upper surface 940 of the conveyor system 950, which in this instance is singular and continuous between the magnetic induction heating stage and the radiant/convention heating stage, such that no hand off from a first conveyor to a second conveyor is required. The heating element is coupled to a control interface 960.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A cooking system that combines stages of magnetic induction, convection, and radiant heating, comprising:
   a housing defining a cooking chamber and having an inlet for feeding food product into said cooking chamber, and an outlet for discharging cooked food product from said cooking chamber;
   a conveyor apparatus for conveying food product from said inlet to said outlet;
   an array of heating elements disposed in said cooking chamber between said inlet and said outlet;
   a magnetic induction heating stage positioned proximate said inlet; and
   a pressurized air injection system having air outlets disposed proximate said inlet in said cooking chamber for providing a bank of forced air over the food product during an initial thaw stage of the cooking process,
   wherein said magnetic induction stage and said convection and radiant heating stages are spatially separated and are provided sequentially as food product moves from said inlet to said outlet.

2. The cooking system of claim 1, wherein said array of heating elements includes a plurality of gas burners to provide convective heat transfer in said cooking chamber.

3. The cooking system of claim 1, wherein said array of heating elements includes a plurality of electric resistance heating elements to provide radiative heat transfer in said cooking chamber.

4. The cooking system of claim 1, wherein said array of heating elements includes a plurality of gas burners and electric resistance heating elements.

5. The cooking system of claim 1, wherein said array of heating elements includes a plurality of gas burners, electric resistance heating elements, and reflective surfaces, such that the food product is exposed to both convective and radiative heat transfer in said cooking chamber.

6. The cooking system of claim 1, wherein said conveyor apparatus is a continuous conveyor which moves food product through said magnetic induction heating stage and said cooking chamber.

7. The cooking system of claim 1, wherein said conveyor apparatus includes a first conveyor which moves food through said magnetic induction heating stage, and a second conveyor which moves food product through said cooking chamber, and wherein food product is handed off from said first conveyor to said second conveyor.

8. The cooking system of claim 1, wherein said air outlets are disposed over said array of heating elements to direct air past said heating elements such that heat from said heating elements is directed down and toward the food product.

9. The cooking system of claim 1, wherein said magnetic induction heating stage precedes a combined convective and radiant heating stage.

10. The cooking system of claim 1, wherein magnetic induction heating of food product takes place concurrently with convective and radiant heating of the food product.

* * * * *